United States Patent
Davis et al.

(10) Patent No.: US 7,569,948 B2
(45) Date of Patent: Aug. 4, 2009

(54) METHOD AND SYSTEM TO PREVENT FALSE SPEED DISPLAY DURING HIGH ENGINE SPEED OPERATION

(75) Inventors: Jason T. Davis, Williamston, MI (US); Michael B. Wisbiski, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 309 days.

(21) Appl. No.: 11/595,844

(22) Filed: Nov. 10, 2006

(65) Prior Publication Data

US 2008/0073973 A1    Mar. 27, 2008

Related U.S. Application Data

(60) Provisional application No. 60/847,224, filed on Sep. 26, 2006.

(51) Int. Cl.
*B60L 1/00* (2006.01)

(52) U.S. Cl. .................................................. 307/10.1
(58) Field of Classification Search ................. 307/10.1
See application file for complete search history.

(56) References Cited

U.S. PATENT DOCUMENTS 6,701,237 B2 * 3/2004 Sebastian et al. .............. 701/43

FOREIGN PATENT DOCUMENTS

| DE | 102004046254 A1 | 5/2005 |
|---|---|---|
| JP | 05162560 A | 6/1993 |
| JP | 08318836 A | 12/1996 |

\* cited by examiner

*Primary Examiner*—Robert L. Deberadinis

(57) ABSTRACT

A vehicle speed detection system includes a first module that checks a plurality of vehicle operating conditions and a second module that checks a plurality of vehicle set-up conditions. A third module generates a control signal based on output signals provided by the first and second modules. The control signal indicates that a vehicle speed is to be determined based on an anti-lock braking system (ABS) sensor signal if each of the plurality of vehicle operating conditions and each of the plurality of vehicle set-up conditions is met.

8 Claims, 3 Drawing Sheets

METHOD AND SYSTEM TO PREVENT FALSE SPEED DISPLAY DURING HIGH ENGINE SPEED OPERATION

CROSS-REFERENCE TO RELATED APPLICATIONS

This application claims the benefit of U.S. Provisional Application No. 60/847,224, filed on Sep. 26, 2006. The disclosure of the above application is incorporated herein by reference.

FIELD OF THE INVENTION

The present invention relates to vehicles driven by an internal combustion engine, and more particularly to a vehicle speed detection control to prevent false speed display during high engine speed operation.

BACKGROUND OF THE INVENTION

Vehicles include a power plant, such as an internal combustion engine, that generates drive torque. The drive torque is transferred from the engine and through a transmission to drive wheels and to propel the vehicle along a surface. A vehicle speed is monitored, is displayed to the vehicle operator and is used by a control system to regulate vehicle and/or power plant operation.

Some vehicles include a transmission output shaft speed (TOSS) sensor that monitors a rotational speed of the transmission output shaft. The vehicle speed is determined based on the TOSS. The TOSS sensor is responsive to a toothed wheel that is fixed for rotation with the transmission output shaft. More specifically, the TOSS sensor is responsive to the rising and falling edges of the teeth of the toothed wheel, and generates a signal indicating the rate at which the teeth pass the TOSS sensor.

In some vehicles, the transmission output shaft vibrates while the vehicle is stopped or is traveling slowly and the power plant (e.g., the engine) is revved. For example, if the transmission is in a neutral state and the power plant is revved, vibration of the transmission output shaft can result. In some cases, a rising or falling edge of a tooth can be positioned just under the TOSS sensor. If the transmission output shaft sufficiently vibrates, a false or otherwise inaccurate TOSS sensor signal can result.

SUMMARY OF THE INVENTION

Accordingly, the present invention provides a vehicle speed detection control system. The vehicle speed detection system includes a first module that checks a plurality of vehicle operating conditions and a second module that checks a plurality of vehicle set-up conditions. A third module generates a control signal based on output signals provided by the first and second modules. The control signal indicates that a vehicle speed is to be determined based on an anti-lock braking system (ABS) sensor signal if each of the plurality of vehicle operating conditions and each of the plurality of vehicle set-up conditions is met.

In other features, the vehicle speed detection control system further includes a fourth module that generates a vehicle operating condition signal that is based on a difference signal and a threshold value. The vehicle operating condition signal is output to the first module. A fifth module determines the difference signal based on a transmission output shaft speed sensor signal and the ABS sensor signal.

In another feature, the vehicle speed detection control system further includes a fourth module that generates a vehicle operating condition signal that is based on the ABS sensor signal and a threshold value. The vehicle operating condition signal is output to the first module.

In another feature, the vehicle speed detection control system further includes a fourth module that generates a vehicle operating condition signal that is based on an engine speed sensor signal and a threshold value. The vehicle operating condition signal is output to the first module.

In still other features, the vehicle speed detection control system further includes first and second vehicle set-up flags that are input into the second module. The first vehicle set-up flag includes a manual transmission flag and the second vehicle set-up flag includes an ABS flag.

In yet anther feature, the control signal indicates that a vehicle speed is to be determined based on transmission output shaft speed sensor signal if any one of the plurality of vehicle operating conditions or the plurality of vehicle set-up conditions is not met.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
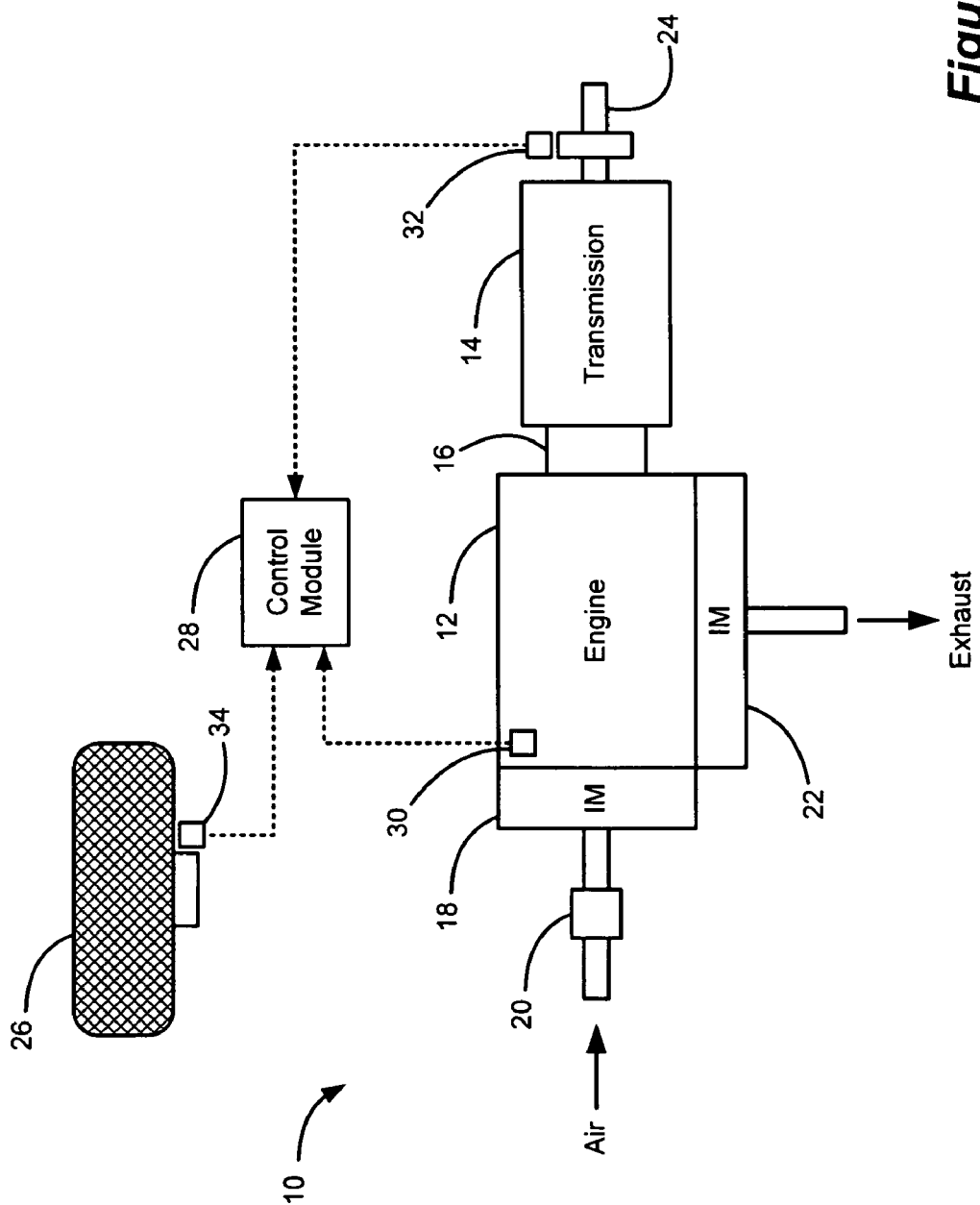
FIG. 1 is a functional block diagram of an exemplary vehicle that implements a vehicle speed detection control in accordance with the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle system 10 is illustrated. The vehicle system 10 includes an engine 12 that drives a transmission 14 through a coupling device 16. In the case of the transmission 14 being an automatic transmission (ATX), the coupling device 16 is a torque converter. In the case of the transmission 14 being a manual transmission (MTX), the coupling device 16 is a clutch.

The engine 12 generates drive torque by combusting an air and fuel mixture within cylinders (not shown). More specifically, air is drawn into an intake manifold 18 through a throttle 20. The air is mixed with fuel and the air/fuel mixture is combusted within the cylinders to rotatably drive a crankshaft (not shown), which in turn drives the transmission 14 through the coupling device 16. Combustion gas is exhausted from the engine through an exhaust manifold 22. The transmission 14 multiplies the drive torque by a selected gear ratio and transfers the drive torque via a transmission output shaft 24 to propel the vehicle system 10 along a surface. More specifically, the vehicle system 10 is supported by at least one wheel 26. Although a single wheel 26 is illustrated, it is anticipated that the vehicle system 10 can include a plurality of wheels 26, and preferably includes four wheels 26.

A control module 28 regulates operation of the vehicle system 10. More specifically, the control module 28 receives engine operation data from various sensors, some of which are described in detail below, and regulates the engine 12 based on the sensor signals. An engine speed sensor 30 generates a signal based on a rotational speed of the engine 12 ($RPM_{ENG}$). A transmission output shaft speed (TOSS) sensor 32 generates a signal based on a rotational speed of the transmission output shaft ($RPM_{TOSS}$). An anti-lock braking system (ABS) includes an ABS sensor 34 that generates a signal based on a rotational speed of the wheel 26 ($RPM_{ABS}$). Although a single ABS sensor 34 is illustrated, it is appreciated that multiple ABS sensors can be implemented. Preferably, the is one ABS sensor 34 for each wheel 26.

The vehicle speed detection control of the present invention determines whether a vehicle speed or velocity ($V_{VEH}$) is to be determined as a function of $RPM_{ABS}$ or a function of $RPM_{TOSS}$. More specifically, the vehicle speed detection control checks a plurality of initial or vehicle set-up conditions including, but not limited to whether the vehicle system 10 includes ABS and whether the transmission 14 is an MTX (e.g., whether a transmission flag ($FLAG_{MTX}$) is set equal to 1). If either the vehicle system 10 does not include ABS or the transmission 14 is not an MTX, $V_{VEH}$ is determined based on $RPM_{TOSS}$.

If the vehicle system 10 includes ABS and the transmission 14 is an MTX, the vehicle speed detection control checks a plurality of vehicle operating conditions. For example, the vehicle speed detection control determines whether the difference of $RPM_{TOSS}$ and $RPM_{ABS}$ is greater than or equal to a first threshold ($k_1$) (i.e., are $RPM_{TOSS}$ and $RPM_{ABS}$ within a sufficient range of one another), whether $RPM_{ABS}$ is less than or equal to a second threshold ($k_2$) (i.e., is the vehicle system 10 moving less than a threshold speed) and whether $RPM_{ENG}$ is greater than or equal to a third threshold ($k_3$) (i.e., is the engine 12 rewing above a threshold RPM).

If the difference of $RPM_{TOSS}$ and $RPM_{ABS}$ is not greater than or equal to $k_1$, or $RPM_{ABS}$ is not less than or equal to $k_2$, or $RPM_{ENG}$ is not greater than or equal to $k_3$, the TOSS sensor signal is deemed rational for the particular operating conditions and $V_{VEH}$ is determined based on $RPM_{TOSS}$. If the difference of $RPM_{TOSS}$ and $RPM_{ABS}$ is greater than or equal to $k_1$, $RPM_{ABS}$ is less than or equal to $k_2$, and $RPM_{ENG}$ is greater than or equal to $k_3$, the TOSS sensor signal is deemed irrational for the particular operating conditions and $V_{VEH}$ is determined based on $RPM_{ABS}$.

Figure 2:
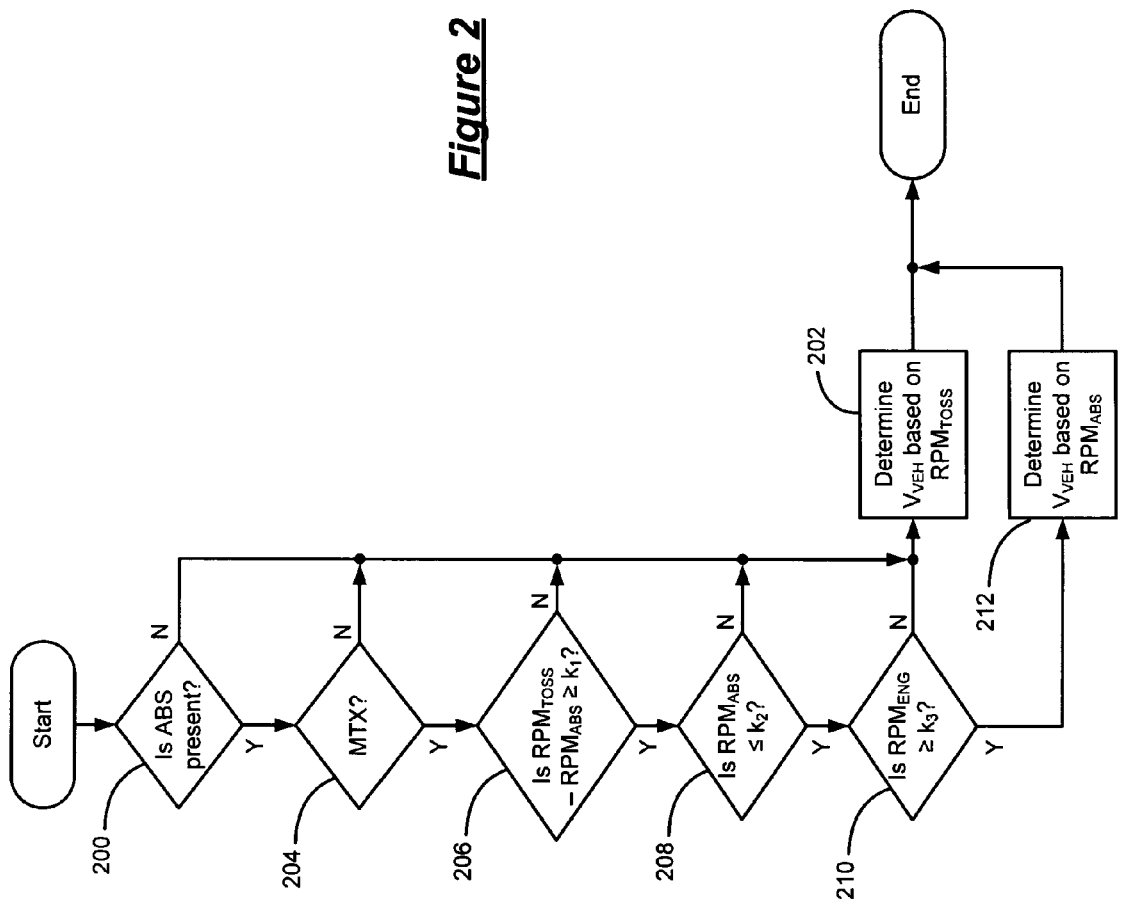
FIG. 2 is a flowchart illustrating exemplary steps executed by the vehicle speed detection control of the present invention.

Referring now to FIG. 2, exemplary steps executed by the vehicle speed detection control will be described in detail. In step 200, control determines whether an ABS system is present. For example, $FLAG_{ABS}$, which is stored in memory, is equal to 1 if an ABS system is present and is equal to 0 if an ABS system is no present. If an ABS system is not present, control continues in step 202. If an ABS system is present, control continues in step 204.

In step 204, control determines whether the transmission is a manual transmission. For example, $FLAG_{MTX}$, which is stored in memory, is equal to 1 if the transmission is a manual transmission and is equal to 0 if the transmission is not a manual transmission. If the transmission is not a manual transmission, control continues in step 202. If the transmission is a manual transmission, control continues in step 206.

In step 206, control determines whether the difference between $RPM_{TOSS}$ and $RPM_{ABS}$ is greater than or equal to $k_1$. If the difference between $RPM_{TOSS}$ and $RPM_{ABS}$ is not greater than or equal to $k_1$, control continues in step 202. If the difference between $RPM_{TOSS}$ and $RPM_{ABS}$ is greater than or equal to $k_1$, control continues in step 208. In step 208, control determines whether $RPM_{ABS}$ is less than or equal to $k_2$. If $RPM_{ABS}$ is not less than or equal to $k_2$, control continues in step 202. If $RPM_{ABS}$ is less than or equal to $k_2$, control continues in step 210.

In step 210, control determines whether $RPM_{ENG}$ is greater than or equal to $k_3$. If $RPM_{ENG}$ is not greater than or equal to $k_3$, control continues in step 202. If $RPM_{ENG}$ is greater than or equal to $k_3$, control continues in step 212. In step 202, control determines $V_{VEH}$ based on $RPM_{TOSS}$ and control ends. In step 204, control determines $V_{VEH}$ based on $RPM_{ABS}$ and control ends.

Figure 3:
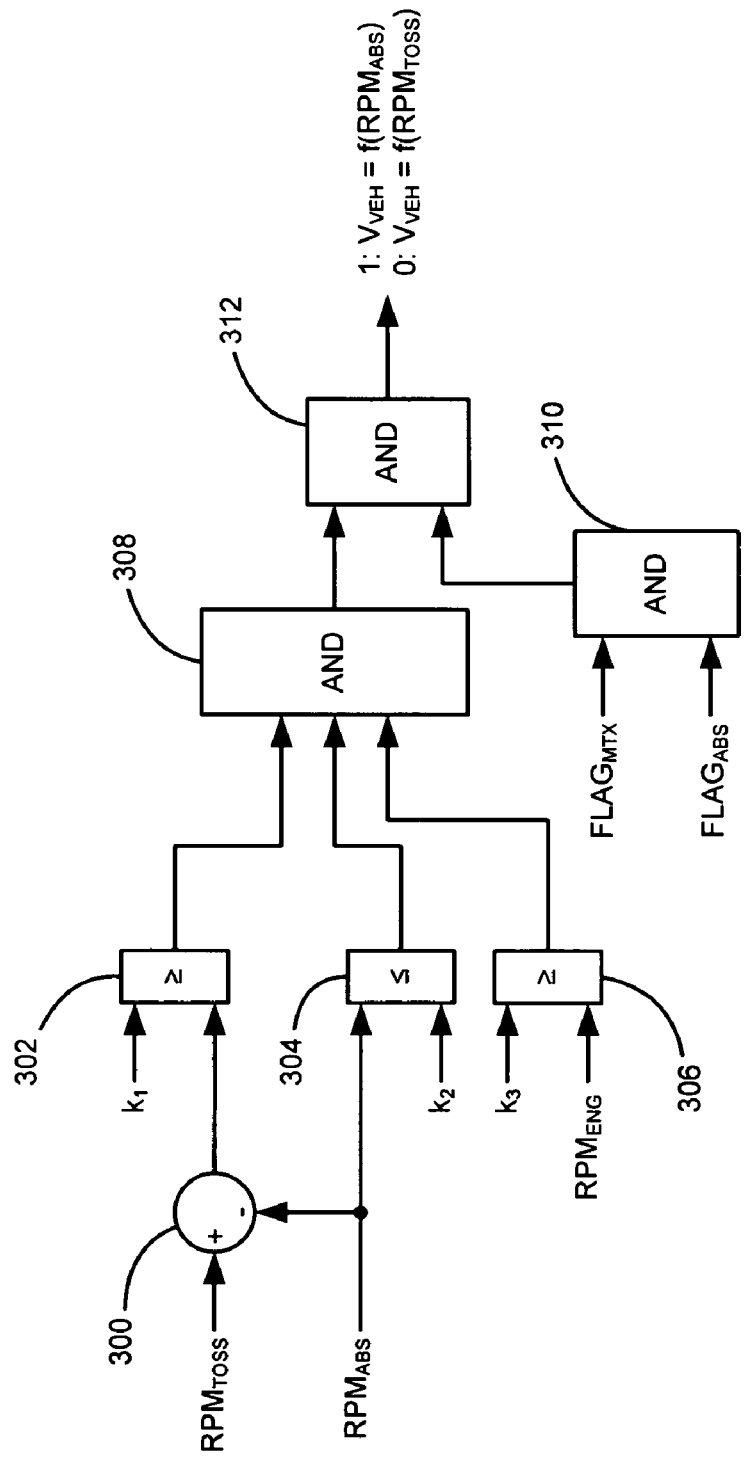
FIG. 3 is a functional block diagram illustrating exemplary modules that execute the vehicle speed detection control of the present invention.

Referring now to FIG. 3, exemplary modules that execute the vehicle speed detection control will be described in detail. The exemplary modules includes a summer 300, first, second and third comparator modules 302, 304 and 306, respectively, and first, second and third AND gate modules 308, 310 and 312, respectively. The summer 300 determines the difference between $RPM_{TOSS}$ and $RPM_{ABS}$ and outputs the difference to the first comparator module 302. The first comparator module 302 determines whether the difference is greater than or equal to $k_1$. If the difference is greater than or equal to $k_1$, the first comparator module 302 outputs a signal value of 1 to the first AND gate module 308. If the difference is not greater than or equal to $k_1$, the first comparator module 302 outputs a signal value of 0 to the first AND gate module 308.

The second comparator module 304 determines whether $RPM_{ABS}$ is less than or equal to $k_2$. If $RPM_{ABS}$ is less than or equal to $k_2$, the second comparator module 304 outputs a signal value of 1 to the first AND gate module 308. If $RPM_{ABS}$ is not less than or equal to $k_2$, the second comparator module 304 outputs a signal value of 0 to the first AND gate module 308. The third comparator module 306 determines whether $RPM_{ENG}$ is greater than or equal to $k_3$. If $RPM_{ENG}$ is greater than or equal to $k_3$, the third comparator module 306 outputs a signal value of 1 to the first AND gate module 308. If $RPM_{ENG}$ is not greater than or equal to $k_3$, the third comparator module 306 outputs a signal value of 0 to the first AND gate module 308.

The first AND gate module 308 receives the signal values from the first, second and third comparator modules 302, 304 and 302, respectively. The first AND gate module 308 generates an output signal based on the operating conditions of the vehicle system 10, which is provided to the third AND gate module 312. More specifically, if each of the above-described vehicle operating conditions is met, the first AND gate module 308 outputs a signal value of 1. If any of the above-described vehicle operating conditions is not met, the first AND gate module 308 outputs a signal value of 0.

The second AND gate module receives the $FLAG_{MTX}$ signal value and the $FLAG_{ABS}$ signal value from memory and generates an output signal based on the vehicle set-up conditions, which is provided to the third AND gate module 312. If both the $FLAG_{MTX}$ signal value and the $FLAG_{ABS}$ signal value are equal to 1, the second AND gate module 310 generates an output signal equal to 1. If either the $FLAG_{MTX}$ signal value or the $FLAG_{ABS}$ signal value is equal to 0, the second AND gate module 310 generates an output signal equal to 0.

The third AND gate module 312 generates a control signal based on the signals provided by the first and second AND gate modules 308, 310. If both input signals are equal to 1, the control signal is set equal to 1. If either input signal is equal to 0, the control signal is set equal to 0. A control signal that is equal to 1 indicates that $V_{VEH}$ is to be determined based on $RPM_{ABS}$ and a control signal that is equal to 0 indicates that $V_{VEH}$ is to be determined based on $RPM_{TOSS}$. A $V_{VEH}$ calculating module (not shown) calculates and displays $V_{VEH}$ accordingly.

Those skilled in the art can now appreciate from the foregoing description that the broad teachings of the present invention can be implemented in a variety of forms. Therefore, while this invention has been described in connection with particular examples thereof, the true scope of the invention should be not so limited since other modifications will become apparent to the skilled practitioner upon a study of the drawings, the specification and the following claims.

What is claimed is:

1. A vehicle speed detection control system, comprising:
   a first module that determines rotational speeds of a transmission output shaft ($RPM_{TOSS}$), a wheel of a vehicle ($RPM_{ABS}$), and an engine crankshaft ($RPM_{ENG}$);
   a second module that generates a first comparison based on a difference between $RPM_{TOSS}$ and $RPM_{ABS}$ and a first threshold, that generates a second comparison based on $RPM_{ABS}$ and a second threshold, and that generates a third comparison based on $RPM_{ENG}$ and a third threshold; and
   a third module that generates a vehicle speed based on $RPM_{TOSS}$, $RPM_{ABS}$, and the first, second, and third comparisons,
   wherein the vehicle speed is based on $RPM_{ABS}$ when the difference between $RPM_{TOSS}$ and $RPM_{ABS}$ is greater than or equal to the first threshold, $RPM_{ABS}$ is less than or equal to the second threshold, and $RPM_{ENG}$ is greater than or equal to the third threshold.

2. The vehicle speed detection control system of claim 1 wherein the vehicle speed is based on $RPM_{ABS}$ when the vehicle includes a manual transmission.

3. The vehicle speed detection control system of claim 2 wherein the vehicle speed is based on $RPM_{ABS}$ when the vehicle includes an anti-lock braking system (ABS).

4. The vehicle speed detection control system of claim 3 wherein the vehicle speed is based on $RPM_{TOSS}$ when at least one of the difference between $RPM_{TOSS}$ and $RPM_{ABS}$ is less than the first threshold, $RPM_{ABS}$ is greater than the second threshold, $RPM_{ENG}$ is less than the third threshold, the vehicle does not include the manual transmission, and the vehicle does not include the ABS system.

5. A method of determining a vehicle speed, comprising:
   determining rotational speeds of a transmission output shaft ($RPM_{TOSS}$), a wheel of a vehicle ($RPM_{ABS}$), and an engine crankshaft ($RPM_{ENG}$);
   generating a first comparison based on a difference between $RPM_{TOSS}$ and $RPM_{ABS}$ and a first threshold, a second comparison based on $RPM_{ABS}$ and a second threshold, and a third comparison based on $RPM_{ENG}$ and a third threshold; and
   generating a vehicle speed based on $RPM_{TOSS}$, $RPM_{ABS}$, and the first, second, and third comparisons,
   wherein the vehicle speed is based on $RPM_{ABS}$ when the difference between $RPM_{TOSS}$ and $RPM_{ABS}$ is greater than or equal to the first threshold, $RPM_{ABS}$ is less than or equal to the second threshold, and $RPM_{ENG}$ is greater than or equal to the third threshold.

6. The method of claim 5 wherein the vehicle speed is based on $RPM_{ABS}$ when the vehicle includes a manual transmission.

7. The method of claim 6 wherein the vehicle speed is based on $RPM_{ABS}$ when the vehicle includes an anti-lock braking system (ABS).

8. The method of claim 7 further comprising:
   determining the vehicle speed based on $RPM_{TOSS}$ when at least one of the difference between $RPM_{TOSS}$ and $RPM_{ABS}$ is less than the first threshold, $RPM_{ABS}$ is greater than the second threshold, $RPM_{ENG}$ is less than the third threshold, the vehicle does not include the manual transmission, and the vehicle does not include the ABS system.

* * * * *